United States Patent [19]
Bakoglu et al.

[11] Patent Number: 5,685,775
[45] Date of Patent: Nov. 11, 1997

[54] NETWORKING VIDEO GAMES OVER TELEPHONE NETWORK

[75] Inventors: Halil Burhan Bakoglu, Ossining; Jeng-Chun Janet Chen, Yorktown Heights; Andy Geng-Chyun Lean, Merrick; Kiyoshi Maruyama, Chappaqua; Ghung-Wai Yue, Yorktown Heights, all of N.Y.

[73] Assignee: International Business Machines Corporation, Armonk, N.Y.

[21] Appl. No.: 330,875

[22] Filed: Oct. 28, 1994

[51] Int. Cl.[6] ............................ A63F 9/24; H04L 5/14; H04M 11/06
[52] U.S. Cl. .................... 463/41; 463/40; 379/90; 379/93; 370/276; 370/902; 370/912; 348/13; 340/825.2; 340/825
[58] Field of Search .................... 273/148 B, 237, 273/439, 453, 459, 460; 379/90, 93, 96, 97, 99; 463/30–31, 1, 40–42; 348/512–513, 715, 12, 13; 370/276, 902, 912; 340/825, 825.2, 825.21

[56] References Cited

U.S. PATENT DOCUMENTS

| | | |
|---|---|---|
| 3,860,952 | 1/1975 | Tallent et al. ........................ 348/715 |
| 3,900,885 | 8/1975 | Tallent et al. ........................ 358/319 |
| 3,993,982 | 11/1976 | Tallent et al. . |
| 4,018,990 | 4/1977 | Long et al. ........................ 348/513 |
| 4,372,558 | 2/1983 | Shimamoto et al. .................. 463/41 |
| 4,570,930 | 2/1986 | Matheson ........................... 273/434 |
| 4,572,509 | 2/1986 | Sitrick ............................... 273/439 |
| 4,958,835 | 9/1990 | Tashiro et al. ................. 273/DIG. 28 |
| 5,273,288 | 12/1993 | Teshima et al. ..................... 463/41 |
| 5,292,125 | 3/1994 | Hochstein et al. ................... 463/41 |
| 5,463,616 | 10/1995 | Kruse et al. . |
| 5,502,443 | 3/1996 | Newberry ........................... 463/40 |
| 5,538,255 | 7/1996 | Barker .............................. 463/41 |
| 5,558,339 | 9/1996 | Perlman ............................ 463/41 |

Primary Examiner—Jessica Harrison
Assistant Examiner—Mark A. Sager
Attorney, Agent, or Firm—Douglas W. Cameron; Ronald L. Drumheller

[57] ABSTRACT

A method and apparatus for playing the same video game by a number of players at remote locations over a telephone network. More specifically, a video representation of the game played by a number of video game players stored at each of the player locations. The control signals representing the actions of the players are then transmitted to a single one of the locations where the control signals are sequenced. The sequence control signals are then stored in a queue wherein the video game is played at each of the locations by synchronously reading the control signals from each queue at each of the locations and sending them to corresponding ports of each video game at each location.

5 Claims, 5 Drawing Sheets

NETWORKING VIDEO GAMES OVER TELEPHONE NETWORK

TECHNICAL FIELD

This invention relates to a method and apparatus for playing a video game among a plurality of players over a telephone network.

DESCRIPTION OF THE PRIOR ART

Today, there are many two-person video games available for machines such as Sega's Genesis, Nintendo's SNES, Atari's Jaguar, etc. However, if two persons want to play any of these games, they must be physically present at the same location and must engage the game with one game machine.

Imagine the situation that two persons have any existing but the exact same game machines (say, Sega's Genesis) and the exact same game software (cartridge or CD-ROM based) but these two persons are located at physically distant locations. Can they play the game over telephone network?

The primary problem of playing games over telephone network is keeping the game synchronized. There are two distinct ways to achieve the game synchronization; state synchronization and I/O synchronization. The state synchronization requires that the state of one machine's game space be transmitted to the rest of the machines, thus it requires hardware and software modifications to existing stand-alone game machines. The I/O synchronization, on the other hand shares players actions only, thus the game synchronization could be achieved by creating add-ons to existing stand-alone game machines. The article titled "Net-Play: A High-Energy Network Solution" by Andre LaMothe, published in Game Developer, June 1994 describes the above two synchronization approaches for networking games.

U.S. Pat. No. 4,570,930 to Thomas G. Matheson proposes new game machines which can be interconnected over the telephone line for networked games. This patent solves the video synchronization problem by one machine transmitting frame count information and position data to other machines. This solution is applicable to creation of new game machines only.

U.S. Pat. No. 5,292,125 to Peter A. Hochstein and Jeffrey Tenenbaum offers add-ons to any existing game machines for networking games, and is incorporated herein by reference. This patent claims that multi-party video games could be played over telephone network if local-payer's action-input is delayed to compensate the arrival delays experienced by the remote-player's actions. This delay insertion to local player's actions provide fairness to players. However, this solution does not guarantee that all game machines receive the players actions in same sequence. Thus, this invention may work in games where the sequence of actions entered by the players does not influence the progress of the game.

There is, therefore, a need for an apparatus and method of playing a video game over a telephone network where each video game machine receives the same sequence of player actions at the same speed. That is, the video game is played synchronously among the players.

SUMMARY OF THE INVENTION

It is, therefore, an object of this invention to insure that each of a number of video game machines receive at the same speed the same sequence of control signals representing actions of individual players playing the same video game with each other over a telephone network.

Accordingly, this invention provides a method and apparatus for playing a video game by a plurality of players at different locations from each other over a telephone network. With this invention, a video representation of the video game being played is stored at each of the locations. Control signals representing the actions of the players in playing the video game are transmitted over the telephone network to a selected one of the locations of the players. The control signals are then sequenced at this location and stored in a queue. The video game is then played at each of the locations synchronously by reading the sequence control signals from the queue at each of the locations and sending these signals to corresponding ports of a video game at each of the locations.

This patent creates an add-on unit to any existing game machine without requiring any modification to either the game machine or the game software. By connecting over a telephone network, two persons who are located at physically distant locations can play the game. The only requirement is that each person has the exact same game machine, the exact same game software and the add-on unit. Since the only information exchanged between game machines over telephone network are players actions and machine-clock related information, any deterministic (cf. random games) games based on cartridge and CD-ROMs could be played over the telephone network.

DESCRIPTION OF THE PREFERRED EMBODIMENT

Figure 1:
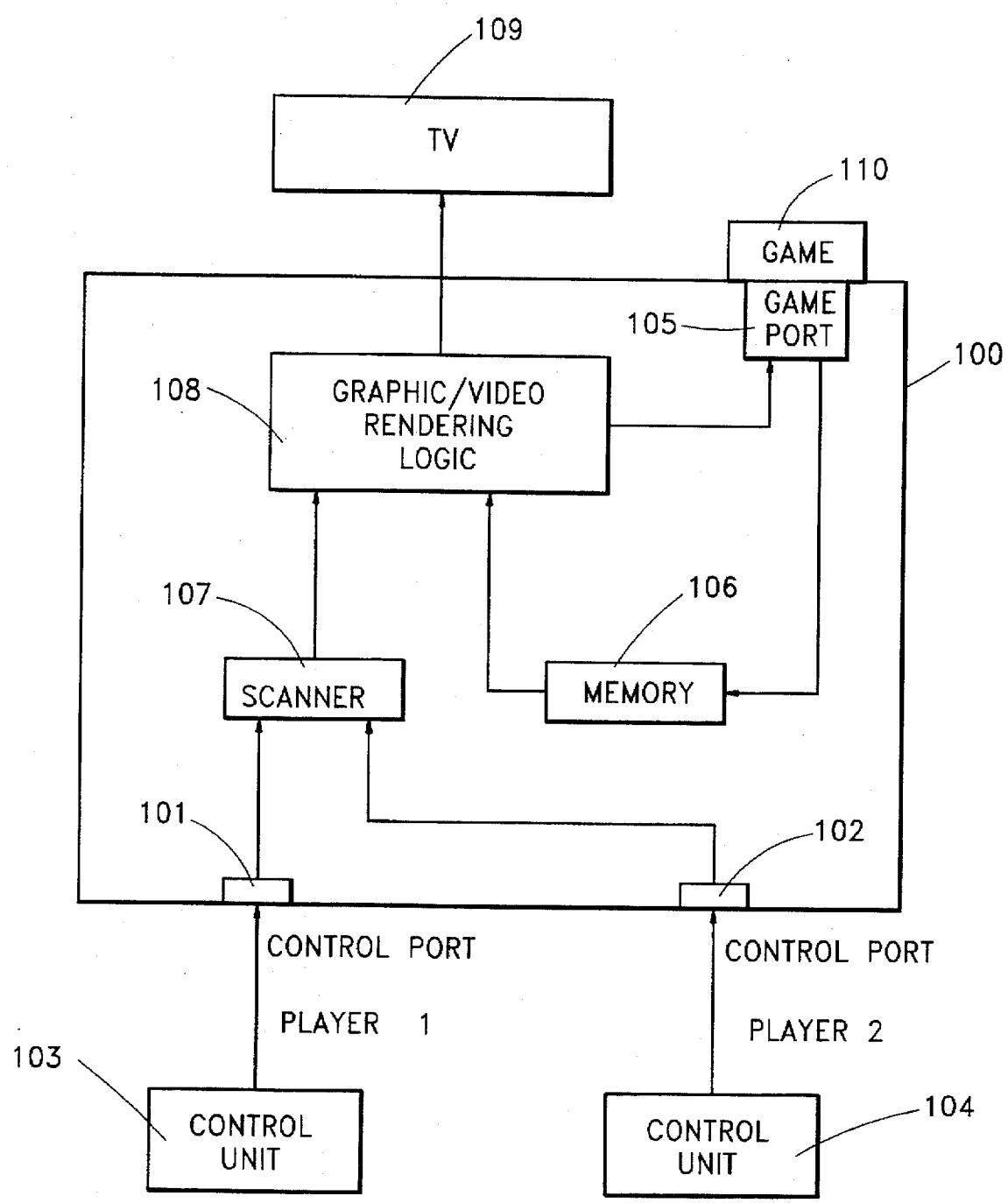
FIG. 1 is a schematic illustration of a standard video game machine.

FIG. 1 depicts a general functional view of a video game machine. A video game machine 100 usually has two control ports 101 and 102 for two players to which game control gears, Control Units 103 and 104, can be attached. This machine 100 also has a game port 105 to which a game 110 (usually in cartridge or CD-ROM form) can be attached. A game machine 100 has memory 106 to store a part of a game software 110, a scanner 107 which scans the ports 101 and 102 to determine the actions by players and a graphic/video rendering logic 108 which creates graphic images for a TV set 109.

Figure 2:
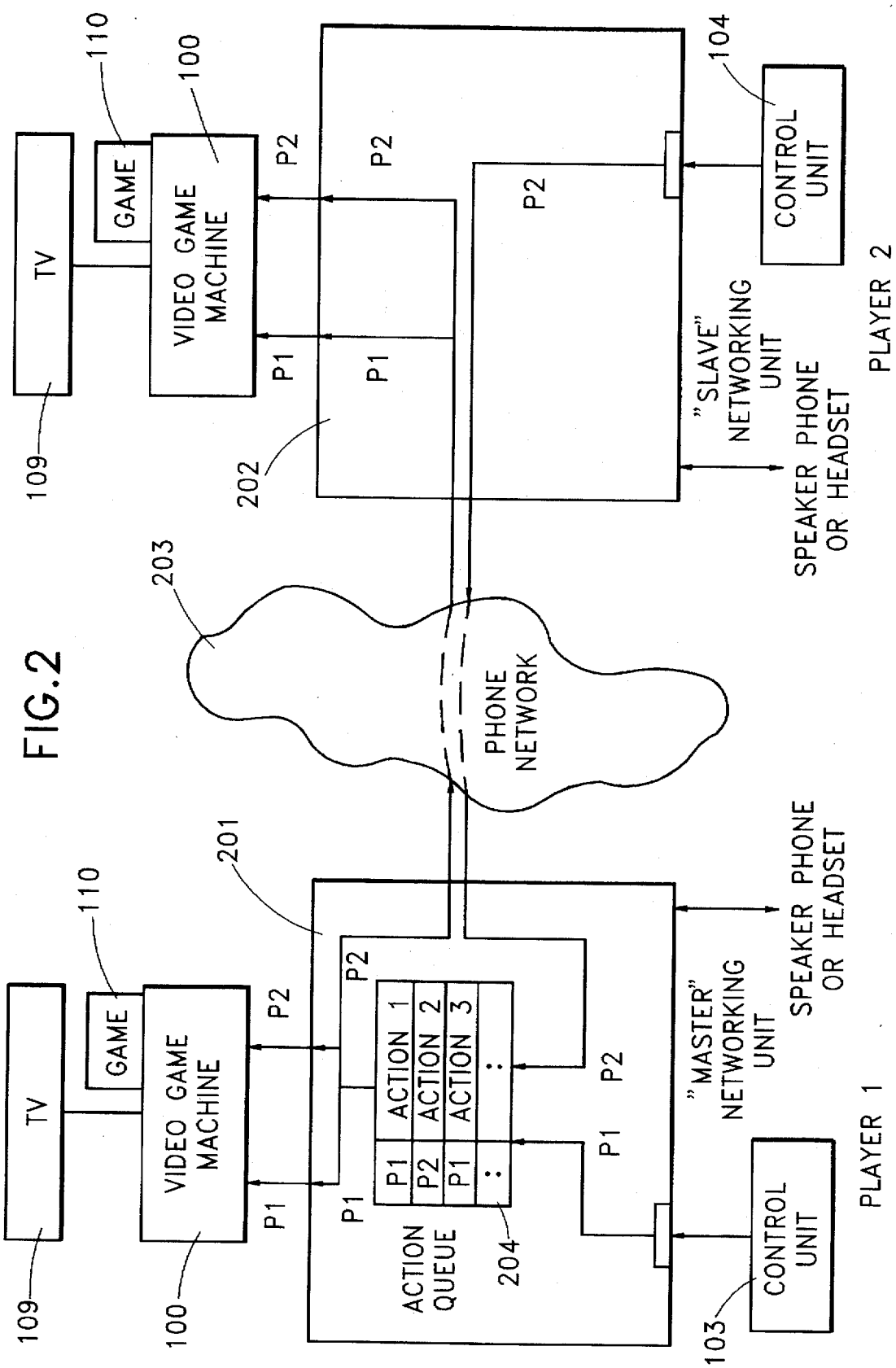
FIG. 2 schematically illustrates the networking units used in this invention as well as the environment in which the invention is used.
Figure 4:
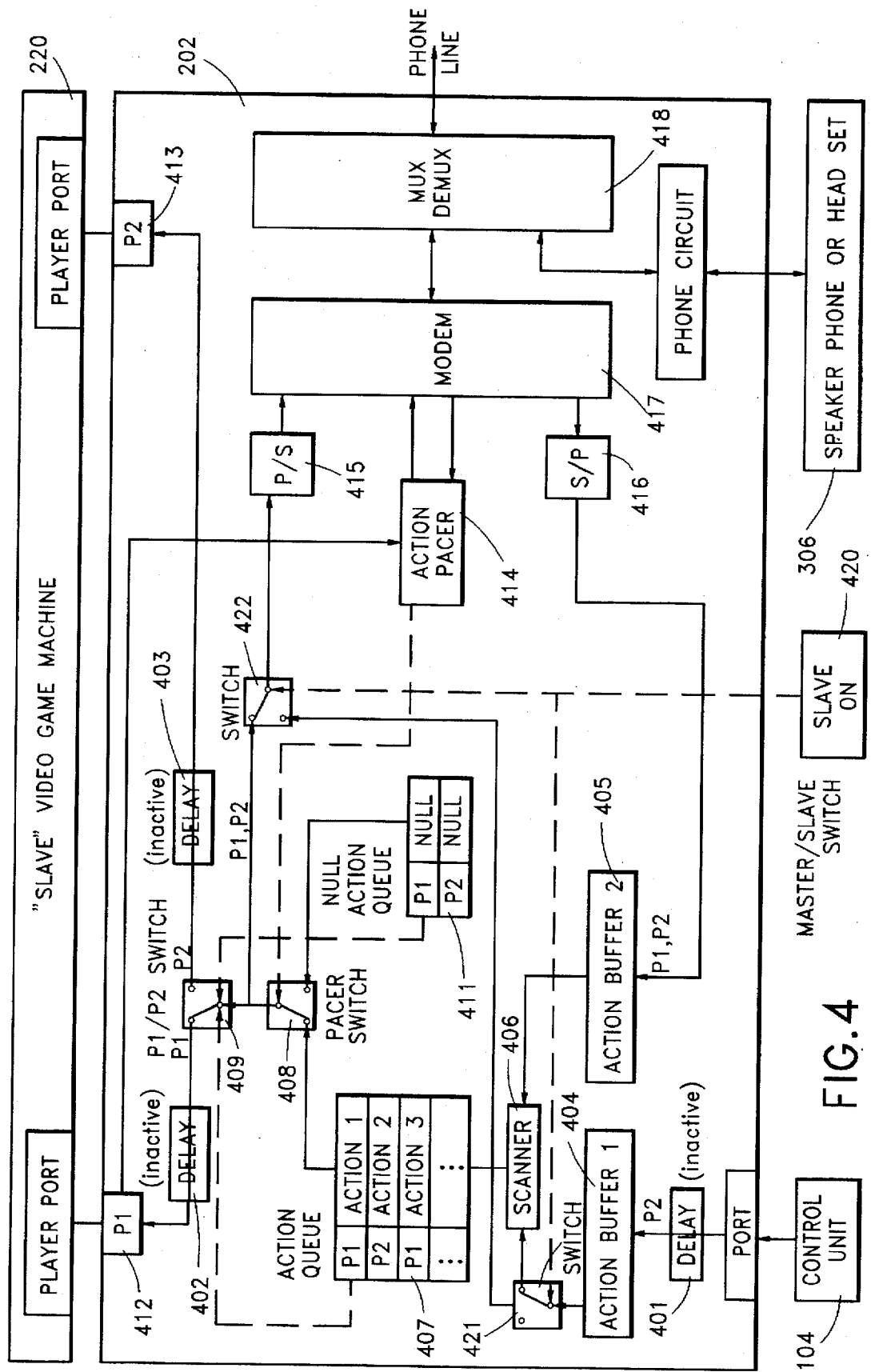
FIG. 4 schematically illustrates the networking unit operating in "slave" mode.

FIG. 2 illustrates the conceptual view of Networking Units 201 and 202 as well as the connections between the TVs 109, video game machines 100, and Control Units 103 and 104. Networking Unit 201 (or 202) is placed between a video game machine 100 and a player's Control Unit 103 (or 104). It is also connected to a phone network 203 via modem. This figure assumes that the left hand side player's Networking Unit 201 is a "master", and the right hand side player's Networking Unit 202 is a "slave". Each Networking Unit 201 (or 202) has Action Queue 204 of queue length one or more. Networking Unit 201 on the "master" side is shown in detail (FIG. 4 shows Action Queue 407 of the "slave" machine 202). The use of actions sequenced in one Action Queue 204 by game machines 100 will guarantee that both machines will receive the players actions in the same order. "Slave" player's actions P2 will be transmitted to the "master" Networking Unit 201 which will merge "slave" player's and "master" player's actions P2 and P1 into Action Queue 204. These actions, stored in Action Queue 204, are fed into the "master" video game machine 100 and also sent to the "slave" Networking Unit 202 to feed the "slave" video game machine 100.

Figure 3:
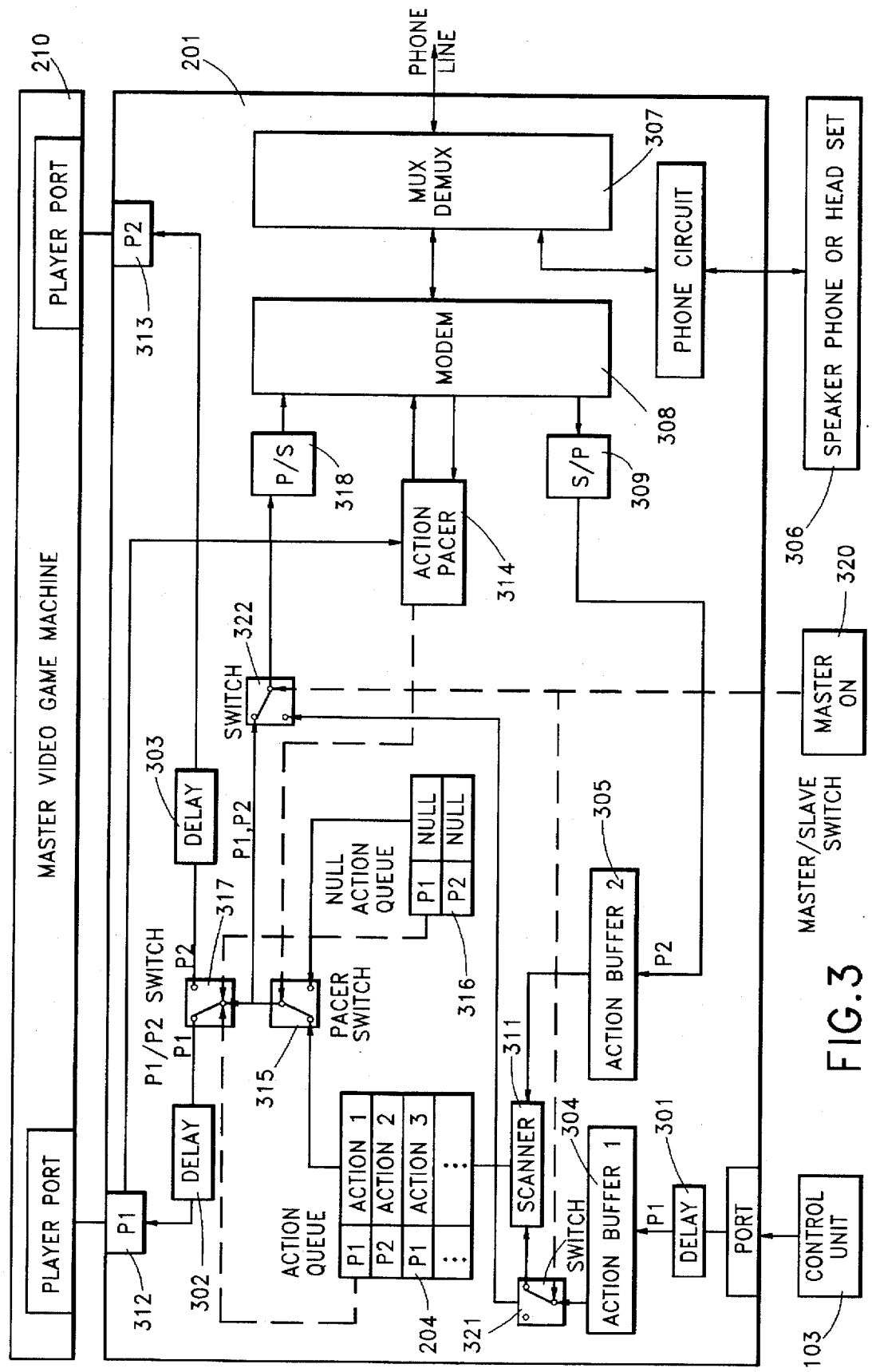
FIG. 3 schematically illustrates the network unit of this invention operating in the "master" mode.

Assuming one-way networking delay of "d" msec, the "slave" player's actions will experience delays of d msec relative to the "master" player's actions. The "slave" player Player 2 experiences $2d$ msec delay between his action and the action being reflected on his TV screen 100. The delay, d, is expected to be about 5 msec for local connections and up to 30 msec for long distance connections within mainland USA. Sometimes this round trip delay $2d$ experienced by the "slave" side player Player 2 is considered unfair. In order to remedy this situation, an optional feature of inserting delays at appropriate places in the "master" Networking Unit can be considered. Referring to FIG. 3, delay 301 in front of Action Buffer 1 (304), and delays 302 and 303 after Action Queue 204 of the "master" Networking Unit 201, will eliminate the perceived unfairness. A simple way to compensate for the delay is to assume a fixed delay of 5 to 10 msec for d of the "master" Networking Unit 201. However, there is prior art in measuring the round trip delay $2d$ by looping the telephone network during setup. Once the delay has been measured, the delay values d at places 301, 302 and 303 in the "master" Networking Unit 201 can be set automatically.

To make the networked games more enjoyable, Networking Units 201 and 202 will support speaker phone or headset. Thus, the players can also converse while they are playing the game.

FIG. 3 illustrates the functional diagram of the networking unit when it is operated in the "master" mode with the phone connection ON. The mode of operation (Master Mode or Slave Mode) is agreed upon by the players when the players make connections over the telephone network. Networking Units 201 (and 202) comes with Master/Slave mode switch 320. FIG. 3 shows switches 321 and 322 and their connections when the master mode has been selected (FIG. 4 shows the same switches but labeled 421 and 422 and their connections when the slave mode has been selected). The "slave" side player actions are received through Mux/Demux 307 and Modem 308 and then S/P 309 (serial to parallel converter) to Action Buffer 2 (305). Scanner 311 scans Action Buffer 1 (304) and Action Buffer 2 (305) alternatively, sequences the players actions from both buffers, and stores them into one Action Queue 204. Each action stored in Action Queue 204 comes with identifier P1 or P2 so that each action can be associated with its corresponding player. Each action in Action Queue 204 is fed into the appropriate player ports 312 and 313, and to the P/S 318 (parallel to serial converter) which is connected through the Modem 308 to the telephone network 203, to feed the "slave" machine 202.

Game machines, even though they are exactly the same, often come with slightly different clocks, thus making frame generation and I/O polling different and eventually games become out of synchronization. To remedy this situation, this patent uses the concept of "action pacing" in which the faster machine inserts "null" actions to match the speed of the I/O polling of the slower machine. Referring to FIG. 3, Action Pacer 314 receives the I/O polling signal from the player port 312 and send it to the other machine via Modem 308. Action Pacer 314 also receives the I/O polling signal at the player port 412 of the other Networking Unit 202 via Modem 308. Action Pacer 314 then determines which game machines 210 or 220 (these machines 210 and 220 are identical to the machine 100, but numbered differently for ease of reference) is running faster. If its own machine 210 is faster, it will then send a signal to Pacer Switch 315 which will then get null actions from Null Action Queue 316, and sends them to P1/P2 Switch. The switching of Pacer Switch to Null Action Queue 316 lasts for twice of the game player port polling period and then it switches back to Action Queue 204. The switching position of P1/P2 SWITCH is controlled by P1 and P2 information fed by Action Queue 204 or by Null Action Queue 316.

Figure 5:
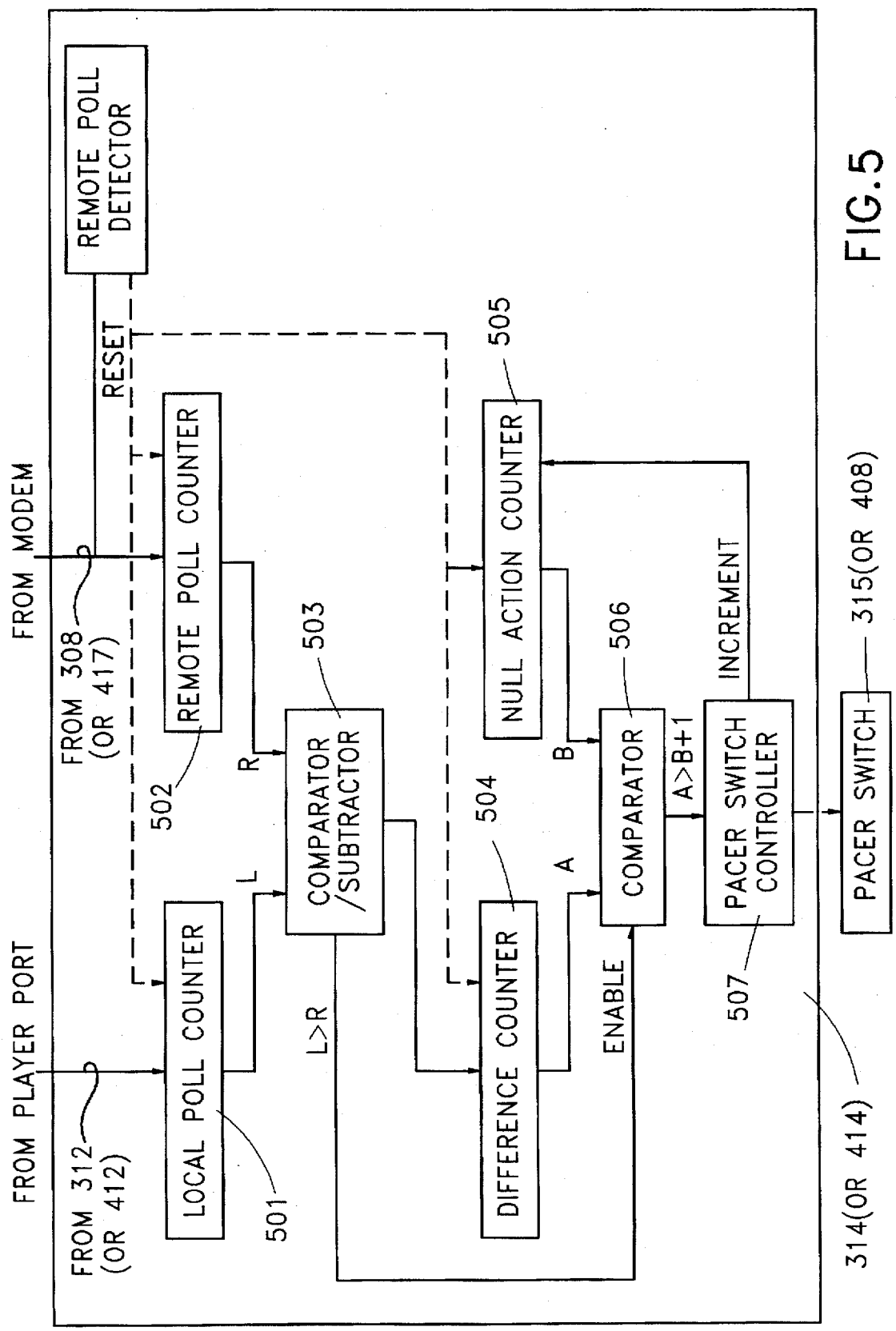
FIG. 5 schematically illustrates the action pacer, which insures synchronous delivery of the control signals representing player actions to each of the ports of the video games at the player locations.

FIG. 5 illustrates the functional diagram of Action Pacer 314 (or 414). Action Pacer 314 (or 414) receives the local game port polling signals from 312 (or 412) and updates Local Poll Counter 501. Action Pacer 314 (or 414) also receives the remote game port polling signals from Modem 308 (or 417) and updates Remote Poll Counter 502. Comparator/Subtractor 503 receives the counter information L from Local Poll Counter 501 and the counter information R from Remote Poll Counter, compares L and R and feeds the difference to Difference Counter 504. Comparator/Subtractor 503 also generates a control signal when L is greater than R and sends the signal to Comparator 506. Comparator 506 receives the counter value A from Difference Counter 504 and the counter value B from Null Action Counter 505, and compare the value A with the value B+1. If A is greater than B+1, Pacer Switch Controller 507 sends a signal to Pacer Switch 315 (or 408) as well as increments Null Action Counter 505 by one. All counters in Action Pacer 314 (or 414) must be reset at the starting time of a game play. Remote Poll Detector 508 detects the receipt of the first remote polling signal and then reset Local Poll Counter 501, Remote Poll Counter 502, Difference Counter 504 and Null Action Counter 505.

FIG. 4 illustrates the networking unit when it is operated in the "slave" mode and the phone connection is ON, and the connections of switches 421 and 422. The "slave" mode is set when the player depressed the slave side of the Master/Slave mode switch 420. The player's actions here are captured in its Action Buffer 1 (404), and then transmitted through P/S 415, Modem 417 and the telephone network 203 to the "master" game machine 201. This "slave" Networking Unit 202 will receive the sequenced players actions from the "master" Networking Unit 201, through the network 203, Mux/Demux 418, Modem 417, S/P 416 and into its Action Buffer 2 (405). Scanner 406 ignores Action Buffer 1 (404) in the Slave mode. Each action stored in Action Queue 407 is then used to feed the appropriate player ports 412 and 413. In the slave mode, the delays 401, 402 and 403 of Networking Unit 202 becomes "inactive".

Action Pacer 414 receives the I/O polling signals from the port 412 and sends them to Modem 417 so that the signals can be received by Action Pacer 314 of the "master" Networking Unit 201. Action Pacer 414 also receives the I/O polling signals at the player port 312 of the "master" Networking Unit 201 via Modem 417. It then determines which game machines 210 or 220 is running faster. If its own machine 220 which is attached to the "slave" Networking Unit 202 is running faster, it then determines when to insert null actions and instruct Pacer Switch 408 to scan in null actions from Null Action Queue 411. The function block diagram of Action Pacer 414 (or 314) is illustrated in FIG. 5.

Although it is not illustrated here, Networking Units 201 and 202 will come with an ON/OFF switch for telephone.

Having thus described our invention, what we claim as new and desire to secure by Letters Patents is:

1. A video game networking unit for connection to ports of a local multiport video game machine and to a telephone network, said unit allowing a plurality of players to play a video game with each other from a plurality of locations over said network, said network unit comprising:

a. a first memory for storing control signals of said players, each of said control signals representing an action of one of said players in playing said video game, wherein those of said control signals representing actions of said players at those of said locations remote from a location of said networking unit are transmitted over said telephone network to said network unit;

b. a scanning unit for sequencing said control signals stored in said first memory, thereby forming a set of sequenced control signals;

c. a second memory for storing a queue of said sequenced control signals;

d. transmitting means for transmitting said sequenced control signals from said queue over said telephone network to said locations remote from the location of said network unit which sequenced said control signals, wherein said sequenced control signals are then transmitted to corresponding ports of a matching multiport video game at each of said locations;

e. a means for reading said sequenced control signals from said queue; and f. a sending means for sending said sequenced control signals read from said queue to corresponding ports of said local multiport video game machine, said sending means comprising:

g. a null queue for storing null signals, each null signal representing no action to be played by a corresponding one of said players;

h. a plurality of switches for interconnecting said action queue, said null queue and said ports; and i. an action pacer for controlling said switches so that said control signals and said null signals are sent to said corresponding ports of said video game machine so that said video game is played synchronously by and among said players.

2. A network unit as recited in claim 1, wherein said first memory comprises a plurality of action buffers, each of said buffers storing the actions of a corresponding one of said players.

3. A method of playing a video game by a plurality of players at different player locations over a telephone network, each of said players having an identical video game machine containing an identical video game program, each said video game machine having a separate port for receiving player action signals from each of said players, comprising the steps of:

designating one of the player locations as a master location and the remaining player locations as slave locations;

transmitting slave player action signals generated by one or more players at one or more slave locations to the master location over the telephone network;

at the master location, sequencing the received player action signals with player action signals generated by a player at the master location to form an action queue;

transmitting the action queue from the master location to each of the slave locations over the telephone network;

at each said slave location, applying the respective player action signals in the received action queue to corresponding ports of the video game machine at said each slave location; and at said master location, applying the respective player action signals in the formed action queue to corresponding ports of the video game machine at said master location, whereby the video game machines at the slave locations and the video game machine at the master location all receive identical player action signals at corresponding ports in a same sequence.

4. A method of playing a video game by two players at different player locations over a telephone network, each of said players having an identical video game machine containing an identical video game program, comprising the steps of:

designating one of the player locations as a master location and the other player location as a slave location;

determining a length of time required for player action signals to be transmitted over the telephone network between the slave location and the master location;

transmitting first player action signals generated by a first player at the slave location to the master location over the telephone network;

delaying second player action signals generated by a second player at the master location by the determined length of time to form delayed second player action signals;

at the master location, sequencing the received first player action signals with the delayed second player action signals to form an action queue;

transmitting the action queue from the master location to the slave location over the telephone network;

applying the first and second player action signals in the action queue received at the slave location to the video game machine at the slave location;

at the master location, delaying the action queue by the determined length of time to form a delayed action queue; and applying the first and second player action signals in the delayed action queue to the video game machine at the master location, whereby the video game machine at the slave location and the video game machine at the master location receive at substantially the same time an identical sequence of first and second player action signals.

5. Apparatus for playing a video game by a plurality of players at different player locations over a telephone network, each of said players having an identical video game machine containing an identical video game program, each said video game machine having a separate port for receiving player action signals from each of said players, comprising:

means for designating one of the player locations as a master location and the remaining player locations as slave locations;

means for transmitting slave player action signals generated by one or more players at one or more slave locations to the master location over the telephone network;

at the master location, means for sequencing the received player action signals with player action signals generated by a player at the master location to form an action queue;

means for transmitting the action queue from the master location to each of the slave locations over the telephone network;

at each said slave location, means for applying the respective player action signals in the received action queue to corresponding ports of the video game machine at said each slave location; and at said master location, means for applying the respective player action signals in the formed action queue to corresponding ports of the video game machine at said master location, whereby the video game machines at the slave locations and the video game machine at the master location all receive identical player action signals at corresponding ports in a same sequence.

* * * * *